(12) United States Patent
Oh et al.

(10) Patent No.: US 10,901,610 B2
(45) Date of Patent: Jan. 26, 2021

(54) ELECTRONIC DEVICE AND METHOD OF EXECUTING FUNCTION THEREOF

(71) Applicant: Samsung Electronics Co., Ltd., Suwon-si (KR)

(72) Inventors: Younghak Oh, Suwon-si (KR); Jaemyoung Lee, Suwon-si (KR); Yunsung Choi, Suwon-si (KR); Sunyoung Yi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/361,993

(22) Filed: Mar. 22, 2019

(65) Prior Publication Data

US 2019/0294324 A1    Sep. 26, 2019

(30) Foreign Application Priority Data

Mar. 22, 2018    (KR) .......................... 10-2018-0033289

(51) Int. Cl.
*G06F 3/0488* (2013.01)
*G06F 3/0485* (2013.01)
*G06F 3/0481* (2013.01)

(52) U.S. Cl.
CPC ........ *G06F 3/04883* (2013.01); *G06F 3/0485* (2013.01); *G06F 3/04812* (2013.01)

(58) Field of Classification Search
CPC .................................................. G06F 3/04845
USPC ......................................................... 715/863
See application file for complete search history.

(56) References Cited

U.S. PATENT DOCUMENTS

| 8,448,084 | B2 | 5/2013 | Brichter |
| 9,400,600 | B2 | 7/2016 | Lee et al. |
| 2013/0232443 | A1* | 9/2013 | Ryu .................. H04M 1/72583 715/784 |
| 2014/0152599 | A1* | 6/2014 | Lee ......................... G06F 3/017 345/173 |
| 2015/0058793 | A1 | 2/2015 | Lee et al. |

(Continued)

FOREIGN PATENT DOCUMENTS

| KR | 10-2013-0033229 A | 4/2013 |
| KR | 10-2013-0083674 A | 7/2013 |

(Continued)

OTHER PUBLICATIONS

International Search Report dated Jul. 3, 2019, issued in International Patent Application No. PCT/KR2019/003355.

*Primary Examiner* — William D Titcomb
(74) *Attorney, Agent, or Firm* — Jefferson IP Law, LLP

(57) ABSTRACT

An electronic device and a method of executing a function of an electronic device are provided. The method includes displaying a portion of a layout containing at least one content and a user interface (UI) object corresponding to at least one function of the electronic device through a touch screen, detecting a user input through the touch screen while a portion of the layout is being displayed, displaying an edge of the layout corresponding to the movement direction of the user input in response to the user input, as the user input is continuously detected while the edge of the layout is being displayed, displaying a first visual effect and displaying a second visual effect, and displaying an execution screen of the at least one function if the predetermined period of time has elapsed.

18 Claims, 12 Drawing Sheets

(56) References Cited

U.S. PATENT DOCUMENTS

| | | | |
|---|---|---|---|
| 2016/0004406 A1 | 1/2016 | Kang et al. | |
| 2017/0139585 A1* | 5/2017 | Lee | G06F 1/1613 |
| 2018/0374452 A1 | 12/2018 | Choi et al. | |

FOREIGN PATENT DOCUMENTS

| | | |
|---|---|---|
| KR | 10-2015-0021722 A | 3/2015 |
| KR | 10-2016-0004590 A | 1/2016 |
| KR | 10-2017-0058223 A | 5/2017 |

* cited by examiner

ELECTRONIC DEVICE AND METHOD OF EXECUTING FUNCTION THEREOF

CROSS-REFERENCE TO RELATED APPLICATION(S)

This application is based on and claims priority under 35 U.S.C. 119(a) of a Korean patent application number 10-2018-0033289, filed on Mar. 22, 2018, in the Korean Intellectual Property Office, the disclosure of which is incorporated by reference herein in their entirety.

BACKGROUND

1. Field

The disclosure relates to an electronic device for displaying content and a technique for executing at least one function of the electronic device.

2. Description of the Related Art

Recently, technology of mobile electronic devices has been rapidly developed. In particular, as touch screens have come to be employed in the electronic device, technology of a user interface (UI) through the touch screen is rapidly developing as well.

A UI using the touch screen refers to a method of receiving various kinds of inputs by detecting touches from a user and of performing various functions. For example, a variety of applications may be executed by the electronic device, and the electronic device may display the content provided by the executed application on the touch screen. The electronic device may detect a user's gesture, and may display other content.

For example, a web browser application may be executed in the electronic device, and a portion of a web page may be displayed on the touch screen of the electronic device. If a user performs a drag gesture on the touch screen, the electronic device may detect the user's drag gesture, and may scroll the web page in one direction to thus display another portion of the web page.

The above information is presented as background information only to assist with an understanding of the disclosure. No determination has been made, and no assertion is made, as to whether any of the above might be applicable as prior art with regard to the disclosure.

SUMMARY

The electronic device may have no more content to be displayed on the screen when displaying content in response to a user input. For example, in the case where a web page is scrolled and displayed in response to a user input to perform a drag gesture, the electronic device may have no more web page to be displayed when the scrolling reaches the end of the web page.

The user may be aware that there is no more content to be displayed, and may want to quickly execute additional functions associated with the content. For example, if there is no more content to be displayed, the user may want to view an execution screen of content that follows or precedes the currently displayed content.

Therefore, a user interface (UI) by which the user can execute functions associated with the currently displayed content with a simple operation should be provided.

Aspects of the disclosure are to address at least the above-mentioned problems and/or disadvantages and to provide at least the advantages described below. Accordingly, an aspect of the disclosure is to provide an electronic device for displaying content and a technique for executing at least one function of the electronic device.

Additional aspects will be set forth in part in the description which follows and, in part, will be apparent from the description, or may be learned by practice of the presented embodiments.

In accordance with an aspect the disclosure, a method of executing a function of an electronic device is provided. The method includes displaying a portion of a layout containing at least one content and a UI object corresponding to at least one function of the electronic device through a touch screen, detecting a user input through the touch screen while the portion of the layout is being displayed, displaying an edge of the layout corresponding to the movement direction of the user input in response to the user input, when the user input is continuously detected while the edge of the layout is being displayed, displaying a first visual effect in an area including the edge of the layout or in an area adjacent to the edge and displaying a second visual effect in which the UI object changes for a predetermined period of time, and when the predetermined period of time has elapsed, displaying an execution screen of the at least one function.

In accordance with another aspect the disclosure, an electronic device is provided. The electronic device includes a touch screen, at least one processor, and at least one memory electrically connected to the touch screen and the at least one processor, wherein the at least one memory stores one or more instructions configured to when a user input signal corresponding to a user input is received through the touch screen while a portion of a layout containing at least one content and a UI object corresponding to at least one function of the electronic device are being displayed, perform control such that the touch screen displays an edge of the layout corresponding to the movement direction of the user input, when the user input signal is continuously received while the edge of the layout is being displayed, perform control such that the touch screen displays a first visual effect in an area including the edge of the layout or in an area adjacent to the edge and displays a second visual effect in which the UI object changes for a predetermined period of time, and if the predetermined period of time has elapsed, perform control such that the touch screen displays an execution screen of the at least one function.

In accordance with another aspect the disclosure, a computer program product is provided. The computer program includes instructions that allow a computer to, when a user input signal corresponding to a user input is received through a touch screen while a portion of a layout containing at least one content and a UI object corresponding to at least one function of an electronic device are being displayed, perform control such that the touch screen displays an edge of the layout corresponding to the movement direction of the user input; when the user input signal is continuously received while the edge of the layout is being displayed, perform control such that the touch screen displays a first visual effect in an area including the edge of the layout or in an area adjacent to the edge and displays a second visual effect in which the UI object changes for a predetermined period of time; and when the predetermined period of time has elapsed, perform control such that the touch screen displays an execution screen of the at least one function.

According to the disclosure, it is possible to provide a first visual effect indicating that there is no more content to be displayed and a second visual effect indicating that a subsequent function can be performed.

According to the disclosure, since the second visual effect is displayed for a UI object corresponding to a function to be executed subsequently, the user may intuitively recognize the function to be executed when there is no more content to be displayed.

According to the disclosure, since the visual form of a UI object gradually changes with the lapse of a predetermined period of time, the user can predict how long it will take for a subsequent function to be executed.

In addition, the disclosure can provide various effects that are directly or indirectly recognized.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, t like reference numerals are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, the content may include images, text, videos, contacts, audio, icons, items, tabs, or combinations thereof.

In the disclosure, a layout containing the content may have a predetermined size, or may have a size that is variable in proportion to the content size. For example, the layout may include a page (e.g., a web page) containing content, a list view containing items, a document, a frame or format including content (e.g., images), and the like.

In the disclosure, the user input may include an input using a user's finger or input by means of a stylus pen. In this case, the user input may include, for example, a user gesture. The user gesture may include a touch gesture, a hold (or long-press) gesture, a drag gesture, a drag-and-hold gesture, a pinch zoom-in/out gesture, a swipe gesture, a tap gesture, a double-tap gesture, and the like.

Figure 1:
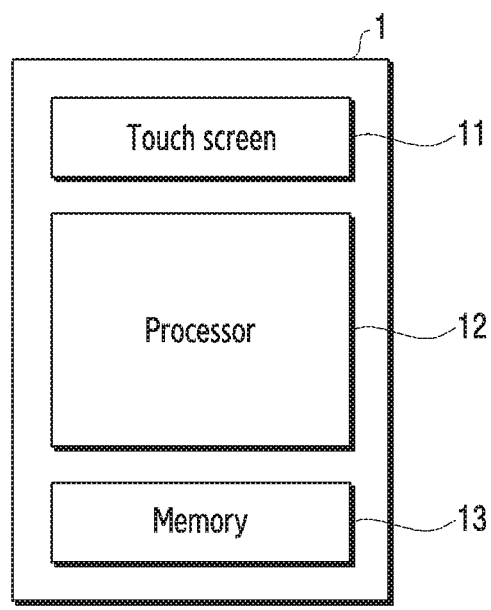
FIG. 1 is a block diagram of an electronic device according to an embodiment of the disclosure.

FIG. 1 is a block diagram of an electronic device according to an embodiment of the disclosure.

Referring to FIG. 1, an electronic device 1 may include a touch screen 11, a processor 12, and a memory 13.

The touch screen 11 may detect a user gesture, or may display at least one piece of information (e.g., a layout containing content). The touch screen 11 may be configured as a combination of a display device and a touch circuit, and a detailed description of the display device will be made later with reference to FIG. 11, and thus a duplicate description thereof will be omitted here.

The processor 12 may drive a program stored in the memory 13 to thus control at least one element of the electronic device 1, or may process a variety of data to thus perform control such that the touch screen 11 displays information. A detailed description of the processor 12 will be made later with reference to FIG. 11, and thus a duplicate description thereof will be omitted here.

If a user input signal corresponding to a user input is received through the touch screen 11 while a portion of the layout containing at least one content and a user interface (UI) object corresponding to at least one function of the electronic device 1 are being displayed on the touch screen 11, the processor 12 may perform control such that the touch screen 11 displays an edge of the layout corresponding to the movement direction of the user input. If the user input signal is continuously received through the touch screen 11 while the edge of the layout is being displayed on the touch screen 11, the processor 12 may perform control such that the touch screen 11 displays a first visual effect in an area including the edge of the layout or in an area adjacent to the edge and displays a second visual effect in which the UI object changes for a predetermined period of time.

The memory 13 may store a variety of data, such as software, input data for instructions, or output data therefor, which are used by at least one element of the electronic device 1. A detailed description of the memory 13 will be made later with reference to FIG. 11, and thus a duplicate description thereof will be omitted here.

The memory 13 may store at least one instruction that allows the processor 12 to perform control such that if a user input signal corresponding to a user input is received through the touch screen 11 while a portion of the layout containing at least one content and a UI object corresponding to at least one function of the electronic device 1 are being displayed, the touch screen 11 displays an edge of the layout corresponding to the movement direction of the user input. In addition, the memory 13 may store at least one instruction that allows the processor 12 to perform control such that if the user input signal is continuously received while the edge of the layout is being displayed, the touch screen 11 displays a first visual effect in an area including the edge of the layout or in an area adjacent to the edge and displays a second visual effect in which the UI object changes for a predetermined period of time. Furthermore, the memory 13 may store at least one instruction that allows the processor 12 to perform control such that if a predetermined period of time has elapsed, the touch screen 11 displays an execution screen of at least one function corresponding to the UI object.

The predetermined period of time may include a specific period of time after the display of the first visual effect starts, a specific period of time after the display of the first visual effect ends, a specific period of time after the display of the edge of the layout starts, or a specific period of time after the continuous user input is determined to be a hold gesture.

The memory 13 may store at least one instruction that allows the processor 12 to perform control such that the touch screen 11 displays the second visual effect while the first visual effect is being displayed, displays the second visual effect after the first visual effect is displayed, displays the second visual effect before the first visual effect is displayed, or displays both at least a portion of the first visual effect and at least a portion of the second visual effect.

The user input signal, which is received while a portion of the layout is being displayed, may include a signal corresponding to a drag gesture. In this case, the user input signal received while the edge of the layout is being displayed may be a signal corresponding to a continuous hold gesture following the drag gesture, or may be a signal corresponding to a continuous and additional drag gesture following the drag gesture.

The memory 13 may store at least one instruction that allows the processor 12 to perform control such that if a predetermined period of time has elapsed and if no user input is detected, the touch screen 11 displays an execution screen of at least one function corresponding to the UI object.

The at least one function may include a function of displaying a screen previous to the current screen displayed on the touch screen 11 or a function of displaying a screen subsequent to the current screen.

The second visual effect may include the effect in which the visual form of the UI object changes as a predetermined period of time elapses. In this case, the change in the visual form of the UI object may include an operation in which at least a portion of the UI object gradually switches from a first color to a second color in proportion to the lapse of a predetermined period of time. In addition, the second visual effect may include the effect in which the scale of a screenshot of the screen including the layout changes as a predetermined period of time elapses.

Figure 2:
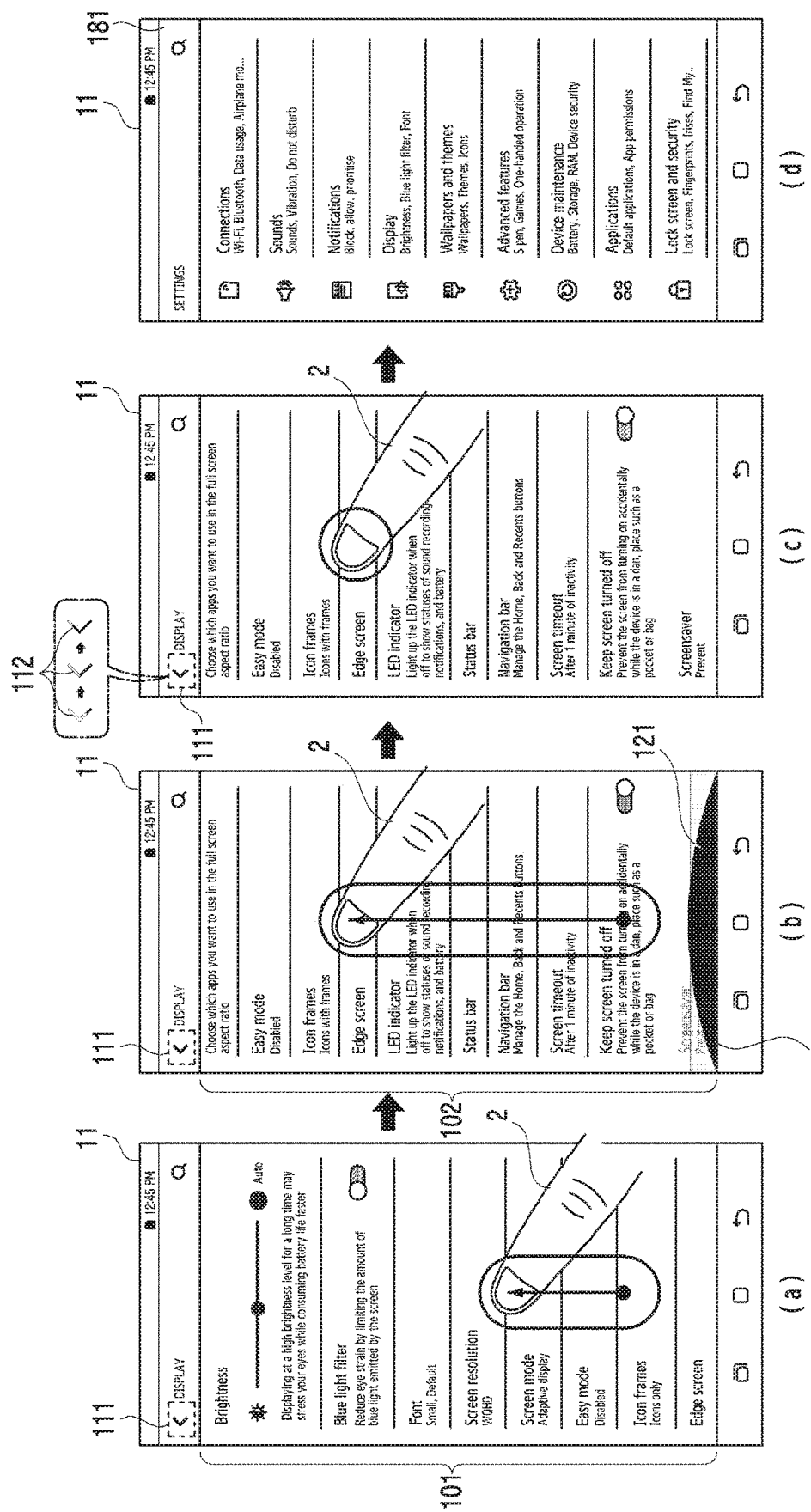
FIG. 2 is a view illustrating a process in which at least one function is executed in an electronic device according to an embodiment of the disclosure.

FIG. 2 is a view illustrating a process in which at least one function is executed in an electronic device 1 according to an embodiment of the disclosure.

Referring to FIG. 2, the processor 12 of the electronic device 1 may perform control such that the touch screen 11 displays a portion 101 of the layout containing at least one content and a UI object 111 corresponding to at least one function of the electronic device 1, as shown in screen (a). For example, the content may include a plurality of display setting items. In addition, the at least one function corresponding to the UI object 111 may include a function of displaying a screen previous to the current screen displayed on the touch screen 11 or a function of displaying a parent screen of the currently displayed screen.

The touch screen 11 may detect a user input 2 while the portion 101 of the layout is being displayed. The user input 2 may include, for example, a drag gesture to scroll a plurality of display setting items in one direction.

If a user input signal corresponding to the user input 2 is received, as shown in screen (b), the processor 12 may perform control such that the touch screen 11 displays another portion 102 of the layout corresponding to the movement direction of the user input (or another portion of the layout displayed after the layout is moved along the movement direction of the user input) and an edge 103 of the layout. In this case, if the user input is an upward drag input, the edge of the layout may be the edge located at the lower part of the layout (or the edge corresponding to the lowermost end of the layout). On the other hand, if the user input is a downward drag input, the edge of the layout may be the edge located at the upper part of the layout or the edge corresponding to the uppermost end of the layout.

The touch screen 11 may continue to detect the user input 2 while the edge 103 of the layout is being displayed. The continuously detected user input, for example, may be a continuous user input following the user input detected on screen (a), or may be a user input separated therefrom. For example, the continuously detected user input may be a drag gesture or a drag-and-hold gesture.

If the user input signal corresponding to the user input 2 is continuously received while the edge 103 of the layout is being displayed, the processor 12 may perform control such that the touch screen 11 displays a first visual effect 121 in an area including the edge 103 of the layout or in an area adjacent to the edge 103 of the layout as shown in screen (b). The first visual effect 121 may indicate that there is no more display item to be displayed even if the user input signal is continuously received.

In addition, if the user input signal corresponding to the user input 2 is continuously received while the edge 103 of the layout is being displayed, the processor 12 may perform control such that the touch screen 11 displays a second visual effect 112 in which the UI object 111 changes for a predetermined period of time as shown in screen (c). As the predetermined period of time elapses, the processor 12 may perform control such that the touch screen 11 displays the UI object 111 while gradually (or sequentially) changing the visual form thereof. For example, the processor 12 may control the touch screen 11 so as to display the UI object 111 such that at least a portion of the UI object 111 gradually switches from a first color to a second color (or a second color in which at least one of the color, brightness, or chroma has been changed) in proportion to the lapse of the predetermined period of time. In this case, the first color may have a brightness or chroma higher than that of the second color. For example, if the first color is dark, the second color may be light. In addition, if the first color is turbid, the second color may be clear. Alternatively, the first color and the second color may complement each other.

The predetermined period of time may include a specific period of time after the edge 103 of the layout is displayed, a specific period of time after the display of the first visual effect 121 starts, a specific period of time after the display of the first visual effect 121 ends (or disappears), or a specific period of time after the continuous user input 2 is determined to be a hold gesture. The predetermined period of time may have, for example, at least one value between 0.2 seconds and 0.6 seconds, and preferably, may have a value of 0.2 seconds or 0.3 seconds, but is not limited thereto.

If the predetermined period of time has elapsed, as shown in screen (d), the processor 12 may perform control such that the touch screen 11 displays an execution screen 181 of at least one function corresponding to the UI object 111. For example, the at least one function may include a function of displaying a screen previous to the current screen displayed on the touch screen 11 or a function of displaying a parent screen of the currently displayed screen. The processor 12 may execute at least one function preemptively (or in response to a specified event regardless of a predetermined period of time). For example, the processor 12 may preemptively execute at least one function after the edge 103 of the layout is displayed, after the display of the first visual effect 121 starts, after the display of the first visual effect 121 ends, or after the user input is detected as a hold gesture.

If the user input signal corresponding to user input 2 is continuously received while the edge 103 of the layout is being displayed, the processor 12 may perform control such that the touch screen 11 displays at least a portion of the second visual effect 112 in screen (c) while the first visual effect 121 in screen (b) is being displayed. Alternatively, the processor 12 may perform control such that the touch screen 11 displays the second visual effect 112 in screen (c) first and then displays the first visual effect 121 in screen (b). Alternatively, the processor 12 may perform control such that the touch screen 11 displays the second visual effect 112 in screen (c) after the display of the first visual effect 121 in screen (b) ends. Alternatively, the processor 12 may perform control such that the touch screen 11 displays the first visual effect 121 in screen (b) and the second visual effect 112 in screen (c) at the same time.

If the user input signal corresponding to user input 2 is continuously received while the edge 103 of the layout is being displayed, the processor 12 may perform control so as to display the second visual effect 112 in screen (c), instead of displaying the first visual effect 121 in screen (b).

If the second visual effect 112 is displayed, and if the user input signal corresponding to the user input 2 is not received for a predetermined period of time, the processor 12 may perform control such that the touch screen 11 displays an execution screen 181 of at least one function corresponding to the UI object 111. For example, if the user performs a gesture to release the hold, the processor 12 may perform control such that the touch screen 11 displays an execution screen 181 of at least one function corresponding to the UI object 111.

Figure 3:
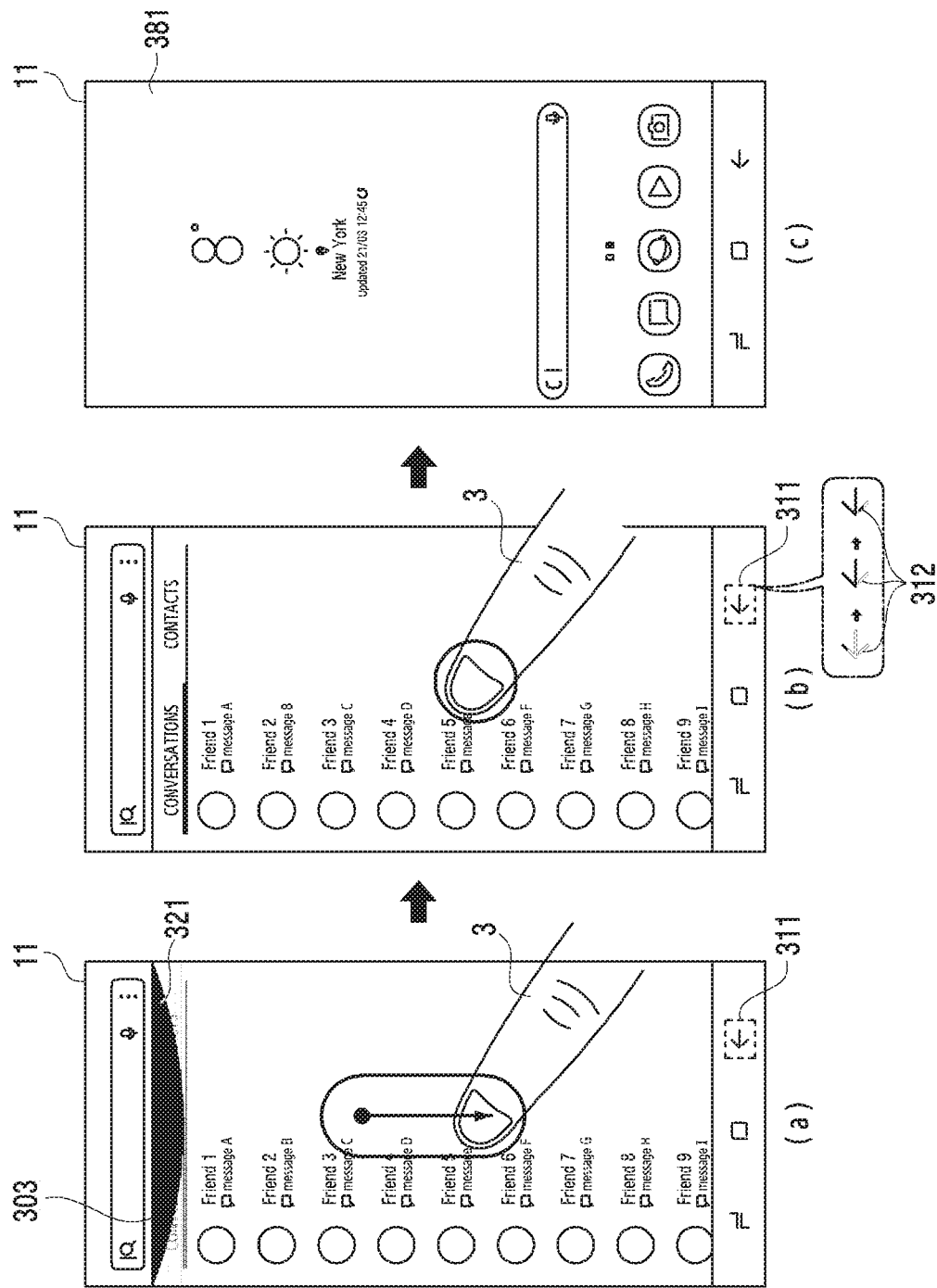
FIG. 3 is a view illustrating a process in which at least one function is executed in an electronic device according to an embodiment of the disclosure.

FIG. 3 is a view illustrating a process in which at least one function is executed in an electronic device 1 according to an embodiment of the disclosure.

Referring to FIG. 3, the processor 12 of the electronic device 1 may perform control such that the touch screen 11 displays an edge 303 of the layout containing at least one content and a UI object 311 corresponding to at least one function of the electronic device 1, as shown in screen (a). For example, the content may include a plurality of contact items. In addition, the at least one function corresponding to the UI object 311 may correspond to a back button.

In screen (a), the touch screen 11 may detect a user input 3 while the edge 303 of the layout is being displayed. The user input 3 may be, for example, a drag gesture in one direction. In this case, if there is no more content to be displayed according to the user input signal corresponding to the user input 3, the processor 12 may perform control such that the touch screen 11 displays a first visual effect 321.

If the user input signal corresponding to the user input 3 is continuously received, as shown in screen (b), the processor 12 may perform control such that the touch screen 11 displays a second visual effect 312 in which the UI object 311 changes for a predetermined period of time. In this case, the user input 3 may be, for example, a continuous hold gesture following the drag gesture in screen (a).

In screen (a), if the user input 3 is detected through the touch screen, the processor 12 may perform control so as to display both the first visual effect 321 in screen (a) and at least a portion of the second visual effect 312 in screen (b). The processor 12 may perform control so as to display both the first visual effect 321 in screen (a) and at least a portion of the second visual effect 312 in screen (b) while the drag gesture is being detected.

In screen (b), as a predetermined period of time elapses, the processor 12 may perform control such that the touch screen 11 displays the UI object 311 while gradually changing the visual form thereof.

For example, the processor 12 may control the touch screen 11 so as to display the UI object 311 such that at least a portion of the UI object 311 gradually switches from a first color to a second color in proportion to the lapse of the predetermined period of time.

If the predetermined period of time has elapsed, as shown in screen (c), the processor 12 may perform control such that the touch screen 11 displays an execution screen of at least one function corresponding to the UI object 311. For example, the processor 12 may perform control such that the touch screen 11 displays an execution screen 381 of a function corresponding to a back button, as at least one function corresponding to the UI object 311. In screen (c), the execution screen 381 of a function corresponding to the back button may be, for example, a home screen.

Figure 4:
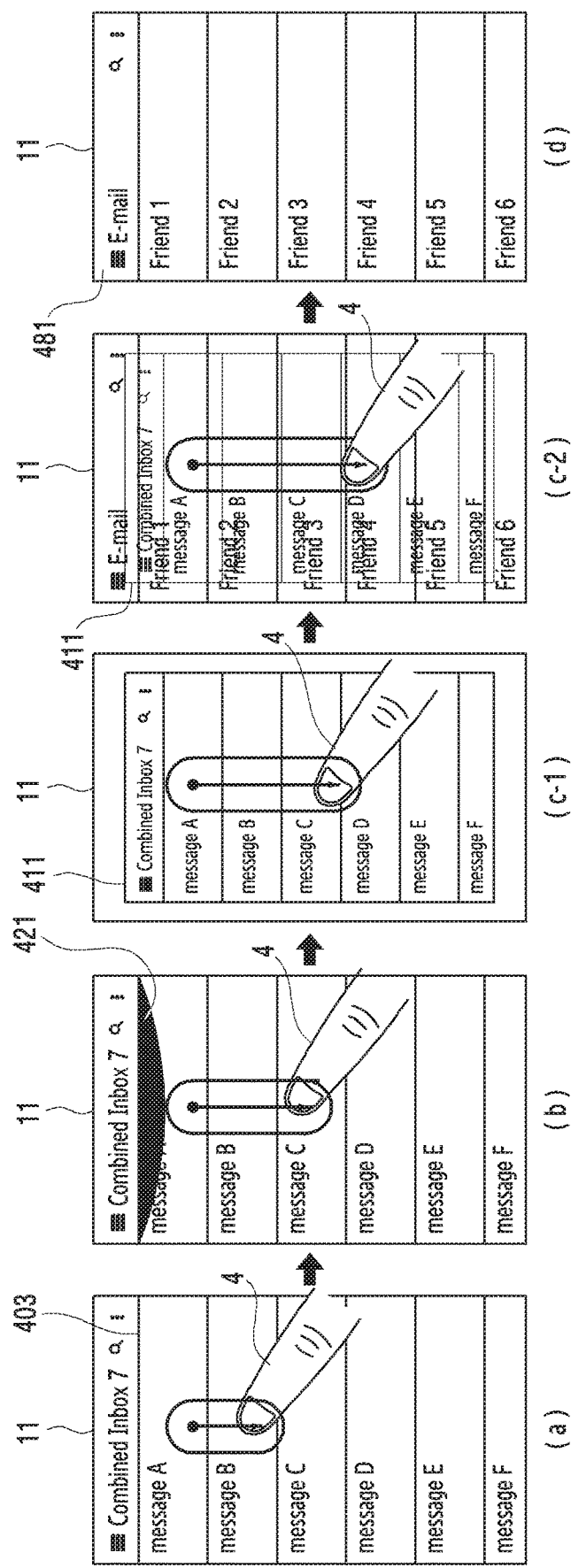
FIG. 4 is a view illustrating a process in which at least one function is executed in an electronic device according to an embodiment of the disclosure.

FIG. 4 is a view illustrating a process in which at least one function is executed in an electronic device according to an embodiment of the disclosure.

Referring to FIG. 4, the processor 12 of the electronic device 1 may perform control so as to display an edge 403 of the layout containing at least one content, as shown in screen (a).

In screen (a), the touch screen 11 may detect a user input 4 while the edge 403 of the layout is being displayed. The user input 4 may be, for example, a drag gesture.

If there is no more content to be displayed in response to the user input signal corresponding to the user input 4, as shown in screen (b), the processor 12 may perform control such that the touch screen 11 displays a first visual effect 421. In this case, the user input signal corresponding to the user input 4 may be continuously received. The user input 4 may be, for example, a continuous drag gesture following the drag gesture in screen (a).

If the user input signal corresponding to the user input 4 is continuously received, as shown in screens (c-1) and (c-2), the processor 12 may perform control such that the touch screen 11 displays a second visual effect in which the UI object 411 changes for a predetermined period of time. In this case, the user input 4 may be, for example, a continuous drag gesture following the drag gesture in screen (b).

The second visual effect may indicate that a screenshot (or thumbnail) 411 of the screen, which is displayed as the UI object 411, is gradually changed in scale as a predetermined period of time elapses, as shown in screens (c-1) and (c-2). The screenshot 411 of the screen may be gradually reduced in the size thereof as the second visual effect. In addition, according to various implementations, the screenshot 411 of the screen may gradually grow, rotate, fade out, or fade in as the second visual effect.

If the predetermined period of time has elapsed, the processor 12 may perform control such that the touch screen 11 displays an execution screen 481 of at least one function as shown in screen (d). In this case, the at least one function may be a function that is predetermined to correspond to the user input according to the disclosure. The predetermined function may be preset as a default value by, for example, the manufacturer of the electronic device 1, the provider of the application set in the electronic device 1, the provider of the operating system (OS), or the like. Alternatively, the predetermined function may be specified in advance by the user through a UI.

In screen (d), the processor 12 may perform control such that the touch screen 11 displays, for example, a previous screen (or a previous page) as the predetermined function.

In various embodiments, the execution screen of at least one function may be displayed in advance in the second visual effect. For example, in screen (c-2), as the second visual effect, the screenshot 411 of the screen may overlap the execution screen 481 of at least one function. For example, the screenshot 411 of the screen may fade out and the execution screen 481 of at least one function may fade in while overlapping each other.

Figure 5:
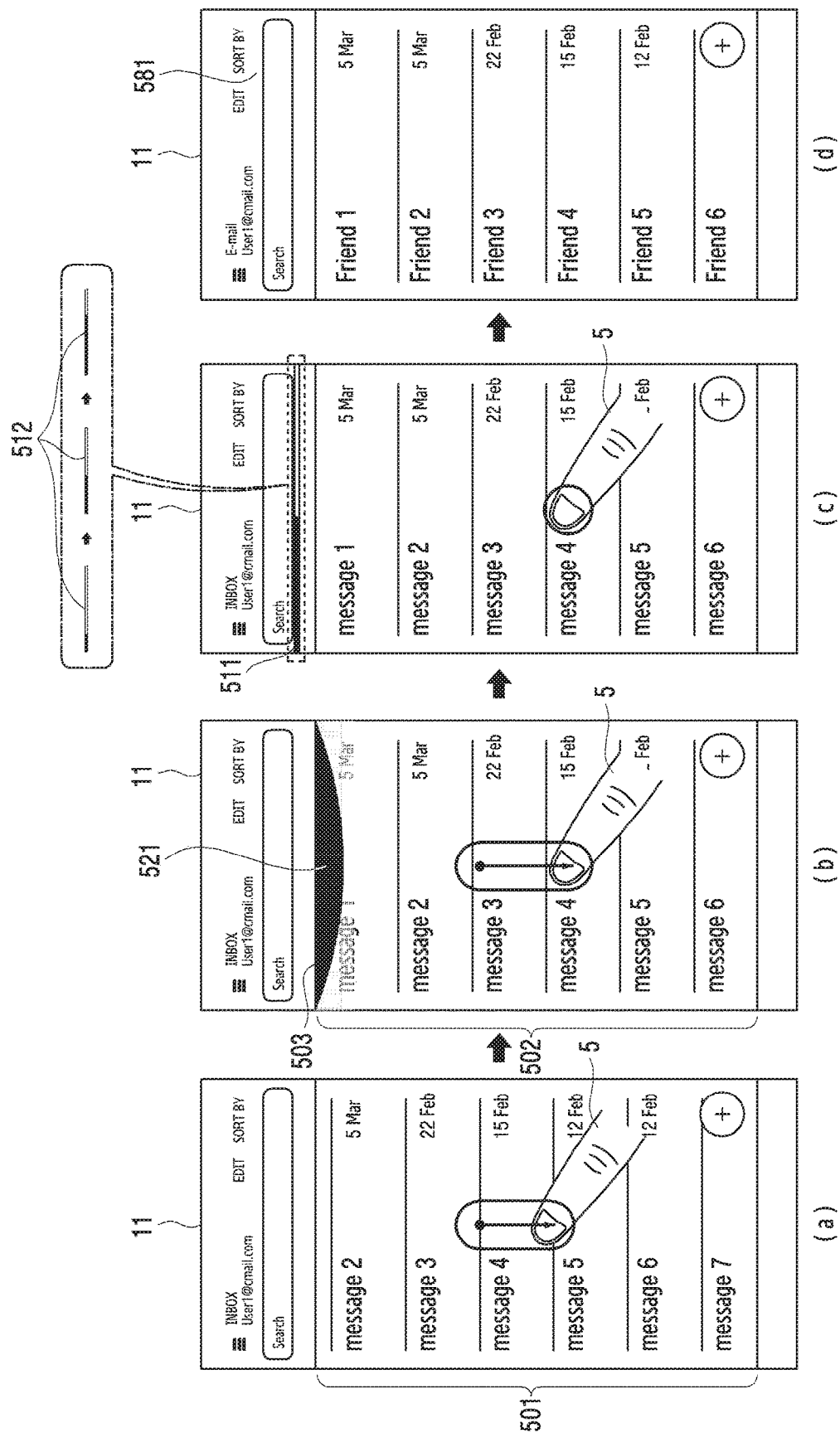
FIG. 5 is a view illustrating a process in which at least one function is executed in an electronic device according to an embodiment of the disclosure.

FIG. 5 is a view illustrating a process in which at least one function is executed in an electronic device 1 according to an embodiment of the disclosure.

Referring to FIG. 5, the processor 12 of the electronic device 1 may perform control such that the touch screen 11 displays a portion 501 of the layout containing at least one content, as shown in screen (a). In this case, the content may include, for example, a plurality of email items.

In screen (a), the touch screen 11 may detect a user input 5 while the portion 501 of the layout is being displayed. The user input 5 may include, for example, a drag gesture to scroll a plurality of email items in one direction.

If a user input signal corresponding to the user input 5 is received, the processor 12 may perform control such that the touch screen 11 displays another portion 502 of the layout corresponding to the movement direction of the user input 5 and an edge 503 of the layout as shown in screen (b).

If the user input signal corresponding to the user input 5 is continuously received while the edge 503 of the layout is being displayed, as shown in screen (b), the processor 12 may perform control such that the touch screen 11 displays, around the edge 503 of the layout, a first visual effect 521 indicating that there are no more email items to be displayed.

If the first visual effect 521 ends after the lapse of a predetermined period of time, the processor 12 may perform control such that the touch screen 11 displays a second visual effect 512 in which the UI object 511 changes for a predetermined period of time as shown in screen (c). The user input 5 may be, for example, a continuous hold gesture following the drag gesture in screen (b).

In this case, the second visual effect 512 may be provided for a newly displayed UI object 511 that has not been displayed in screens (a) and (b). As the predetermined period of time elapses, the processor 12 may control the touch screen 11 so as to display the UI object 511, which is newly displayed, such that the visual form thereof gradually changes. For example, a progress bar of the UI object 511 may be gradually increased as the predetermined period of time elapses (e.g., in proportion to the lapse of the predetermined period of time).

If the predetermined period of time has elapsed, the processor 12 may perform control such that the touch screen 11 displays an execution screen 581 of at least one function as shown in screen (d). In this case, the at least one function may be a function predetermined to correspond to the user input according to the disclosure. The processor 12 may perform control such that the touch screen 11 displays, for example, a previous screen as the predetermined function.

The processor 12 may perform control so as to display an execution screen of at least one function if the user input is no longer detected after the predetermined period of time has elapsed. For example, in screen (c), if the progress bar of the UI object 511 reaches a predetermined level after the predetermined period of time has elapsed, and if the user's hold gesture is released, an execution screen of at least one function may be displayed.

Even if the predetermined period of time has not elapsed, the processor 12 may perform control such that the touch screen 11 displays an execution screen of at least one function if the user input is no longer detected. For example, in screen (c), if the user's hold gesture is released while the predetermined period of time elapses, the processor 12 may perform control such that the touch screen 11 displays an execution screen of at least one function.

Figure 6A:
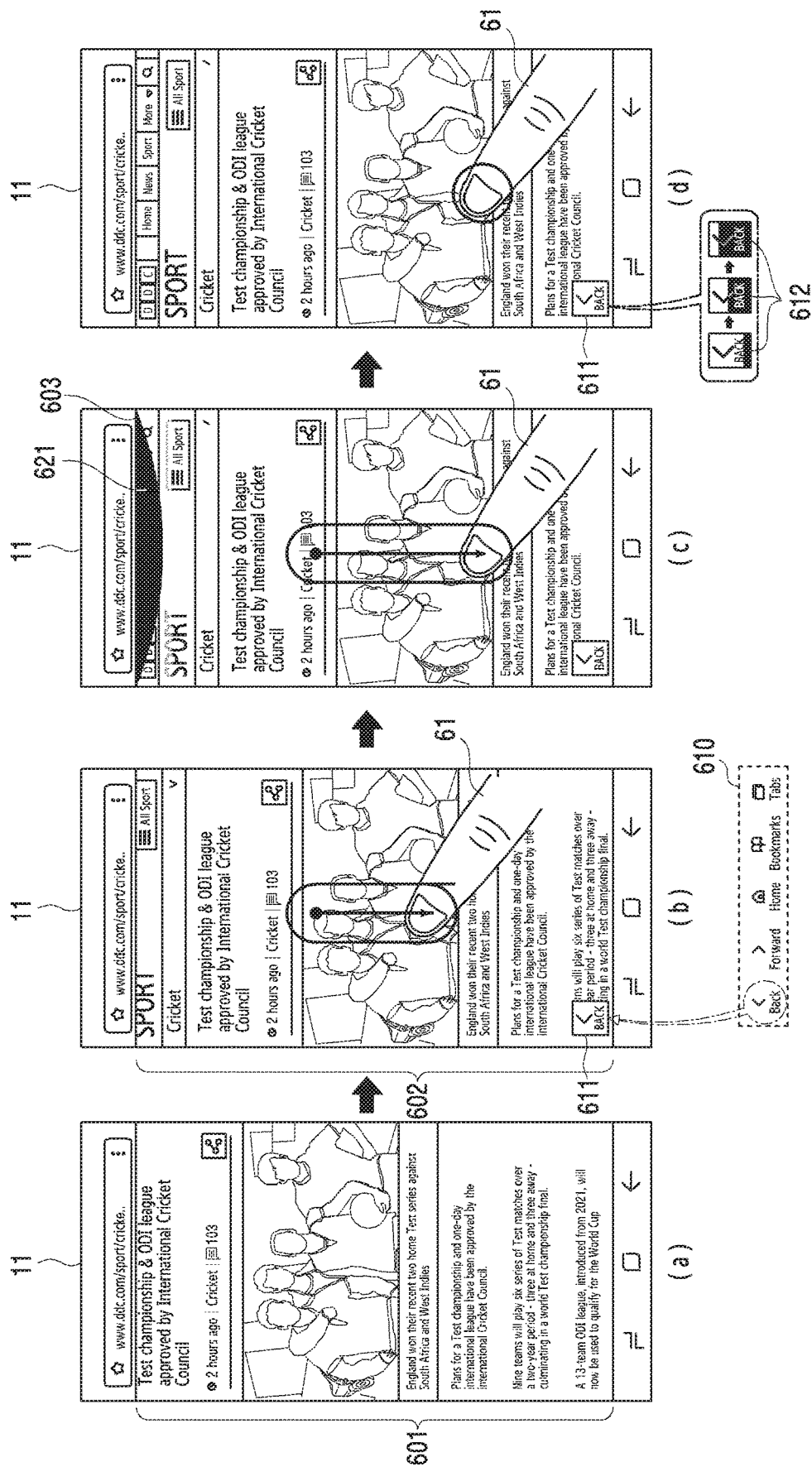
FIG. 6A is a view illustrating a process in which at least one function is executed in an electronic device according to an embodiment of the disclosure.

FIG. 6A is a view illustrating a process in which at least one function is executed in an electronic device 1 according to an embodiment of the disclosure.

Referring to FIG. 6A, the processor 12 of the electronic device 1 may perform control such that the touch screen 11 displays a portion 601 of the layout containing at least one content, as shown in screen (a). In this case, the layout containing at least one content may be a web page.

The touch screen 11 may detect a user input 61, as shown in screen (b), while the portion 601 of the layout containing at least one content is being displayed. The user input 61 may be, for example, a downward drag gesture. The processor 12 of the electronic device 1 may perform control such that the touch screen 11 displays another portion 602 of the layout and a UI object 611 corresponding to at least one function while the user is performing the drag gesture. The UI object 611 may be one of the UI objects 610 capable of controlling the web page, which is automatically provided under specific conditions (e.g., when scrolling the web page in a predetermined direction). The UI object 611, for example, may be displayed to overlap one side of the other portion 602 of the layout.

If the user input signal corresponding to the user input 61 is continuously received, in screen (c), the processor 12 of the electronic device 1 may perform control such that the touch screen 11 displays, around the edge 603 of the layout, a first visual effect 621 indicating that there are no more email items to be displayed. The user input 61 may be, for example, a continuous drag gesture following the drag gesture in screen (b).

If the user input signal corresponding to the user input 61 is continuously received while the edge 603 of the layout is being displayed, as shown in screen (d), the processor 12 may perform control such that the touch screen 11 displays a second visual effect 612 in which the UI object 611 changes for a predetermined period of time. The user input 61 may be, for example, a continuous hold gesture following the drag gesture in screen (c).

For example, the processor 12 may control the touch screen 11 so as to display the UI object 611 such that at least a portion of the UI object 611 gradually switches from a first color to a second color in proportion to the lapse of the predetermined period of time. The gradually changing visual effect may include, for example, a visual effect in which at least a portion of the UI object 611 gradually switches from the first color to the second color from bottom to top.

If the predetermined period of time has elapsed, the processor 12 may perform control such that the touch screen 11 displays an execution screen 650 of at least one function corresponding to the UI object 611 as shown in screen (e). For example, the processor 12 may perform control such that the touch screen 11 displays the execution screen 650 corresponding to a back button as the first function corresponding to the UI object 611.

In screen (e), the processor 12 may perform control such that the touch screen 11 displays a portion 651 of the layout containing at least one content as the execution screen 650 of the function corresponding to the back button. In this case, if the user's hold gesture 61 in screen (d) is released, the processor 12 may perform control such that the touch screen 11 displays a portion 651 of the layout containing at least one content.

In screen (f), the touch screen 11 may detect a user input 62 while the portion 651 of the layout containing at least one content is being displayed. In this case, the user input 62 may be an upward drag gesture, the direction of which is opposite the direction of the drag gesture in screen (b). The processor 12 may perform control such that the touch screen 11 displays a UI object 661 corresponding to at least one function while the drag gesture 62 is being performed by the user. The UI object 661 may be one of the UI objects 610 capable of controlling a web page provided under specific conditions in association with the web page (e.g., when scrolling the web page in a specific direction). In this case, the UI object 611 in screen (b) and the UI object 661 in screen (f) may be different from each other. For example, the functions of the displayed UI objects may be different from each other depending on the gesture direction of the user. For example, the UI object 611 in screen (b) may be a back button, and the UI object 661 in screen (f) may be a forward button.

If the user input signal corresponding to the user input 62 is continuously received, in screen (g), the processor 12 of the electronic device 1 may perform control such that the touch screen 11 displays, around the edge 652 of the layout, a first visual effect 671 indicating that there is no more web page to be displayed.

Figure 6B:
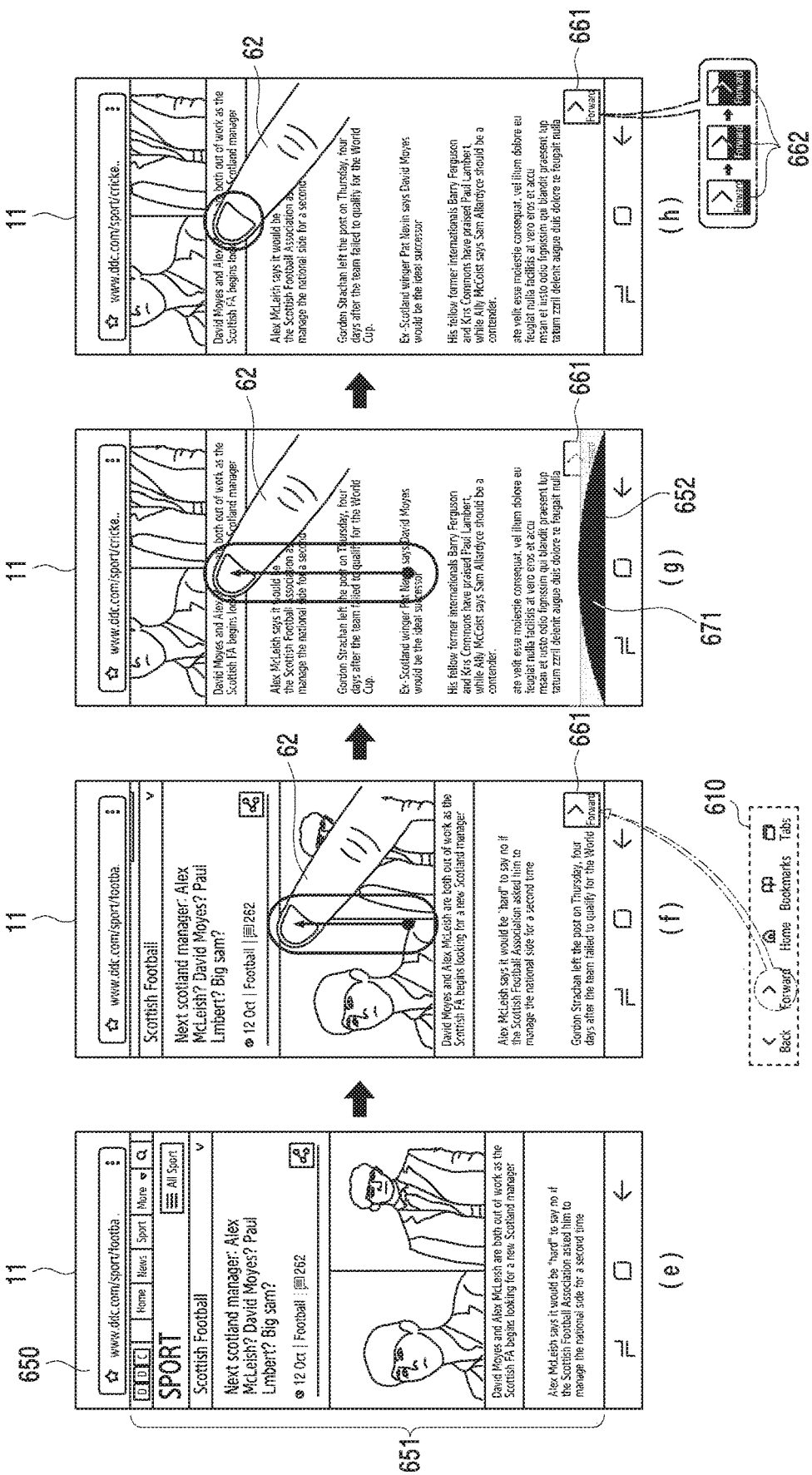
FIG. 6B is a view illustrating a process in which at least one function is executed in an electronic device according to an embodiment of the disclosure.

If the user input signal corresponding to the user input 62 is continuously received while the edge 652 of the layout is being displayed, the processor 12 may perform control such that the touch screen 11 displays a second visual effect 662 in which the UI object 661 changes for a predetermined period of time as shown in FIG. 6B(h). For example, the processor 12 may control the touch screen 11 so as to display the UI object 661 such that at least a portion thereof gradually switches from a first color to a second color in proportion to the lapse of the predetermined period of time.

If the predetermined period of time has elapsed, the processor 12 may perform control such that the touch screen 11 displays an execution screen of at least one function corresponding to the UI object 661. For example, the processor 12 may perform control such that the touch screen 11 displays an execution screen of a function corresponding to a forward button as a second function corresponding to the UI object 661. For example, the processor 12 may perform control such that the touch screen 11 displays the web page shown in screen (a) again.

Figure 7:
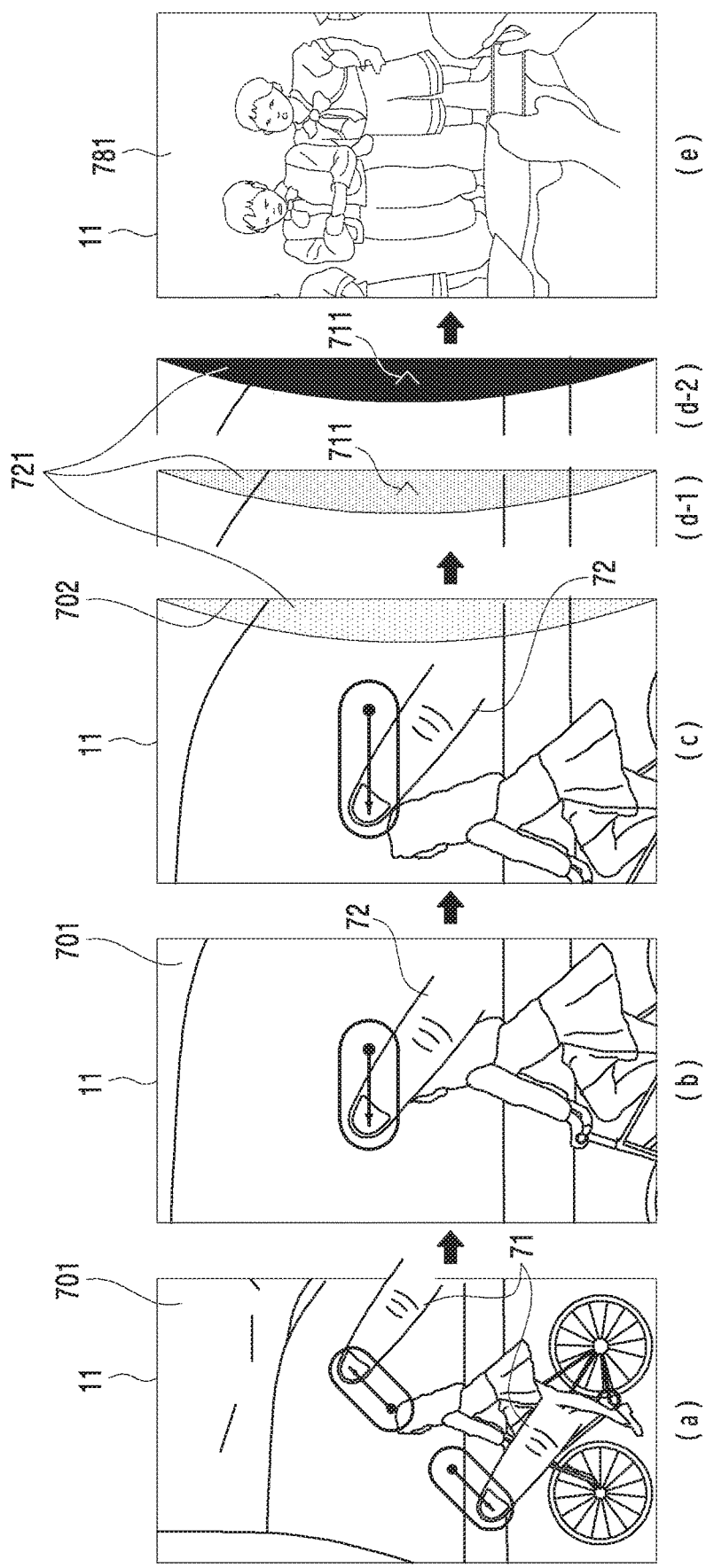
FIG. 7 is a view illustrating a process in which at least one function is executed in an electronic device according to an embodiment of the disclosure.

FIG. 7 is a view illustrating a process in which at least one function is executed in an electronic device according to an embodiment of the disclosure.

Referring to FIG. 7, the processor 12 of the electronic device 1 may perform control such that the touch screen 11 displays a layout containing at least one content 701, as shown in screen (a). The at least one content 701 may be an image, and the layout containing the content may be determined in consideration of the size of a viewport of the touch screen 11.

The touch screen 11 may detect a user input 71 while the image is being displayed. The user input 71 may be, for example, a pinch-out gesture to enlarge the content 701.

In response to the user input 71, the processor 12 of the electronic device 1 may perform control such that the touch screen 11 displays enlarged content 701 as shown in screen (b). In this case, the size of the layout 701 containing the content 701 may also be increased in response to the user input 71.

In screen(c), the touch screen 11 may detect a user input 72 while the enlarged content 701 is being displayed. The user input 72 may be, for example, a drag gesture to the left.

If a user input signal corresponding to the user input 72 is received, the processor 12 may perform control such that the touch screen 11 displays an edge 702 of the content 701 corresponds to the movement direction of the user input 72 as shown in screen (c).

If the user input signal corresponding to the user input 72 is continuously received while the edge 702 of the content 701 is being displayed, the processor 12 may control the touch screen 11 so as to display a first visual effect 721 indicating that there is no more content to be displayed in the movement direction of the user input as shown in screen (c).

If the user input signal corresponding to the user input 72 is continuously received while the edge 702 of the content 701 is being displayed, the processor 12 may perform control such that the touch screen 11 displays a UI object 711 indicating the execution of a function together with the first visual effect 721 for a predetermined period of time as shown in screens (d-1) and (d-2).

In this case, as the predetermined period of time elapses, the processor 12 may perform control such that the touch screen 11 displays a second visual effect in which the UI object 711 gradually changes in the visual form thereof. For example, the processor 12 may gradually change the UI object 711 from a first color to a second color. More specifically, the processor 12 may control the touch screen 11 so as to display the UI object 711 while gradually emphasizing the UI object 711. In this case, the first visual effect 721 may be displayed along with the second visual effect of the UI object 711. In addition, the first visual effect 721 and the second visual effect of the UI object 711 may be displayed so as to overlap each other.

If the predetermined period of time has elapsed, the processor 12 may perform control such that the touch screen 11 displays an execution screen 781 of a function corresponding to the UI object 711 as shown in screen (e). For example, the function corresponding to the UI object 711 may include a function of displaying an image subsequent to the image currently being displayed on the touch screen 11. The subsequent image may be determined in consideration of the name of the image, the shooting date of the image, the size of the image, the tagging information of the image, and the like.

Figure 8:
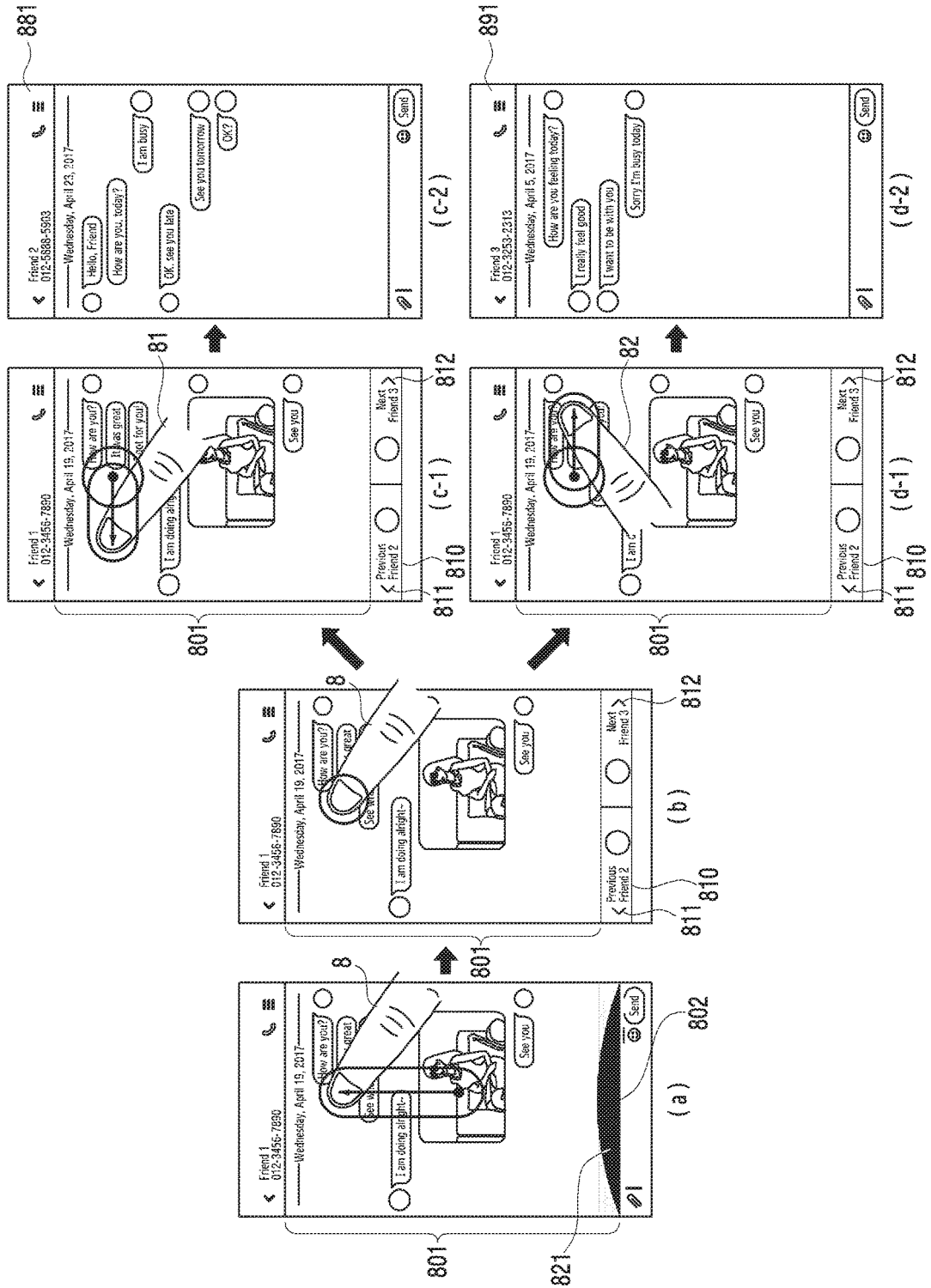
FIG. 8 is a view illustrating a process in which at least one function is executed in an electronic device according to an embodiment of the disclosure.

FIG. 8 is a view illustrating a process in which at least one function is executed in an electronic device 1 according to an embodiment of the disclosure.

Referring to FIG. 8, the processor 12 of the electronic device 1 may perform control such that the touch screen 11 displays an edge 802 of the layout containing at least one content 801, as shown in screen (a). In this case, the layout containing the content may be a dialog window including text messages.

In screen (a), the touch screen 11 may detect a user input 8 while the edge 802 of the dialog window is being displayed. The user input 8 may be, for example, a drag gesture in one direction. If there are no more messages to be displayed in response to the user input 8, the processor 12 may perform control such that the touch screen 11 displays a first visual effect 821.

If the user input signal corresponding to the user input 8 is continuously received, the processor 12 may perform control such that the touch screen 11 displays a plurality of UI objects 810 as shown in screen (b). The functions corresponding to the plurality of UI objects 810 may be some (e.g., at least one) of the functions provided by the application for displaying the dialog window. In this case, the plurality of UI objects 810 may be displayed if a predetermined period of time has elapsed after the first visual effect 821 is displayed.

The plurality of UI objects 810 may include, for example, a UI object 811 for displaying a dialog window with a previous counterpart and a UI object 812 for displaying a dialog window with a next counterpart. In addition, the user input 8 in screen (b) may be, for example, a continuous hold gesture following the drag gesture in screen (a).

The user input signal corresponding to the user input 81 may be continuously received, as shown in screen (c-1), while the plurality of UI objects 810 are being displayed. In this case, the user input 81 may be a continuous gesture 81 of dragging in the first direction following the hold gesture 8 in screen (b).

If a user input signal corresponding to the drag gesture 81 in the first direction is received, the processor 12 may perform control such that the touch screen 11 displays an execution screen 881 of a function corresponding to the UI object 811 corresponding to the user input 81 as shown in screen (c-2). For example, if the user input 81 is a gesture of dragging to the left, the UI object corresponding to the user input 81 may be the UI object 811 located at the left side, among the plurality of UI objects 810.

In screen (c-2), the processor 12 may perform control such that the touch screen 11 displays, as the execution screen 881 of the function corresponding to the UI object 811, a dialog window with a previous counterpart. The previous counterpart may be determined in consideration of the name of the counterpart, the dialog time with the counterpart, the bookmark order, the viewing time of the dialog window, and the like.

In addition, in screen (c-1), if a user input signal corresponding to the user input 81 is received, the processor 12 may perform control so as to display a visual effect in at least a portion of the UI object 811 corresponding to the user input 81, thereby guiding the user to predict the next function to be performed.

While the plurality of UI objects 810 are being displayed in screen (b), the user input signal corresponding to the user input 82 may be continuously received as shown in screen (d-1). In this case, the user input 82 may be a continuous gesture 82 of dragging in the second direction following the hold gesture 8 in screen (b). For example, the gesture 82 of dragging in the second direction may be a gesture of dragging in a direction opposite the first direction in which the gesture 81 of dragging was made in screen (c-1).

If a user input signal corresponding to the user input of the drag gesture 82 in the second direction is received, the processor 12 may perform control such that the touch screen 11 displays an execution screen 891 of a function corresponding to the UI object 812 corresponding to the user gesture 82 as shown in screen (d-2). For example, if the user gesture 82 is a gesture of dragging to the right, the UI object corresponding to the user gesture 82 may be the UI object 812 located at the right side, among the plurality of UI objects 820. In screen (d-2), the processor 12 may perform control such that the touch screen 11 displays, as the execution screen 891 of the function corresponding to the UI object 811, a dialog window with a next counterpart. In screen (d-1), if a user input signal corresponding to the user input 81 is received, the processor 12 may perform control so as to display a visual effect in at least a portion of the UI object 812 corresponding to the user input 81, thereby guiding the user to predict the next function to be performed.

Figure 9:
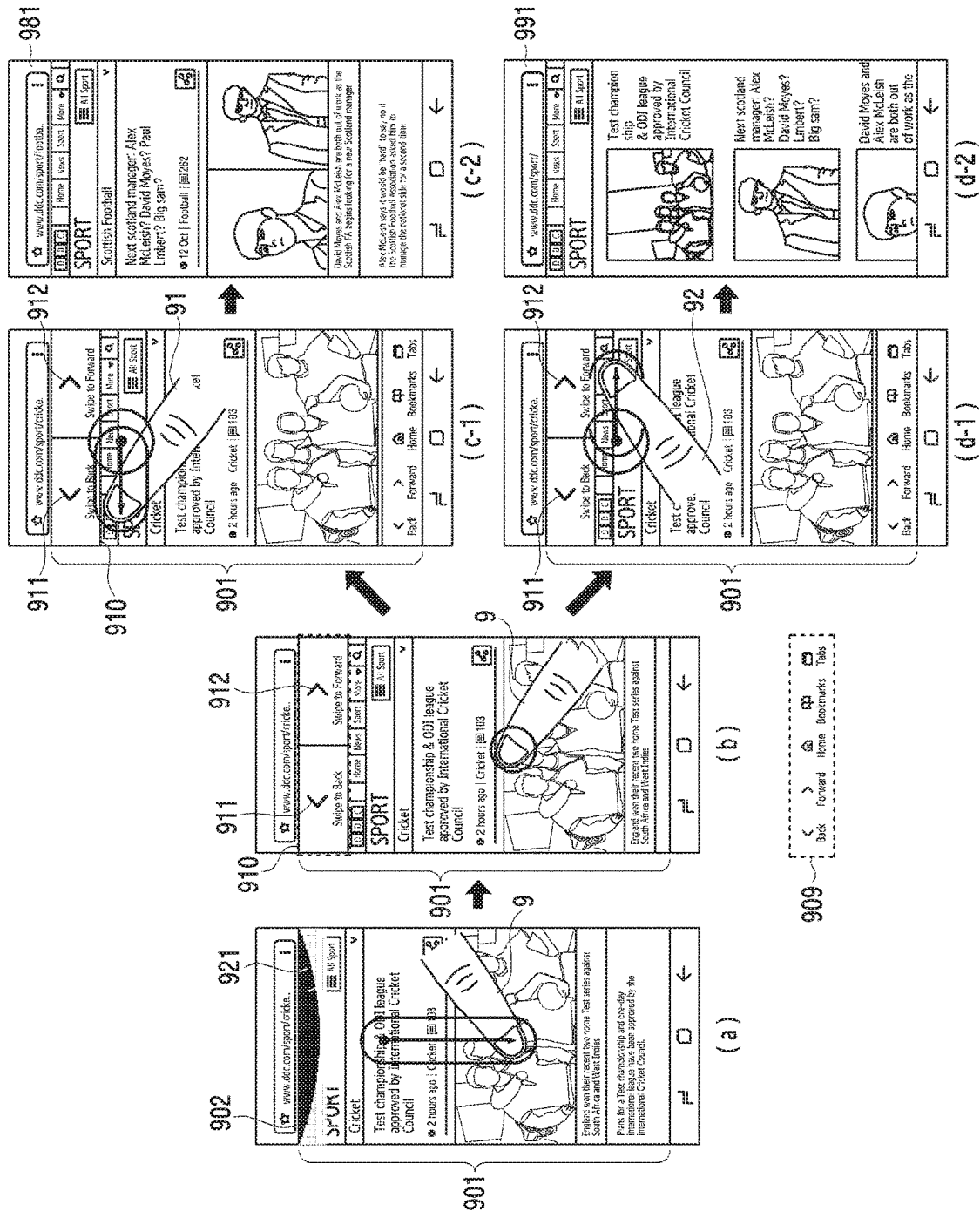
FIG. 9 is a view illustrating a process in which at least one function is executed in an electronic device according to an embodiment of the disclosure.

FIG. 9 is a view illustrating a process in which at least one function is executed in an electronic device 1 according to an embodiment of the disclosure.

Referring to FIG. 9, the processor 12 of the electronic device 1 may perform control such that the touch screen 11 displays an edge 902 of a web page 901, as shown in screen (a). A user input 9 may be continuously detected while the edge 902 of the web page 901 is being displayed. If there is no more message to be displayed in response to the user input 9, the processor 12 may perform control such that the touch screen 11 displays a first visual effect 921.

If the user input signal corresponding to the user input 9 is continuously received, the processor 12 may perform control such that the touch screen 11 displays a plurality of UI objects 910 as shown in screen (b). In this case, the user input 9 may be, for example, a continuous hold gesture following the drag gesture in screen (a). In addition, the plurality of UI objects 910 may be at least one of a plurality of UI objects capable of controlling a web page automatically provided under specific conditions. For example, a UI object 911 of the plurality of UI objects 910 may be a back button for displaying a web page previous to the currently displayed web page 901, and another UI object 912 may be a forward button for displaying a web page subsequent to the currently displayed web page 901. In this case, the plurality of UI objects 910 may have guide information displayed thereon indicating executable functions according to the user's gesture. For example, the guide information "Swipe to Back" may be displayed on one UI object 911, thereby indicating that if the user performs a swipe in the "<" direction, a function corresponding to the back button is performed. In addition, the guide information "Swipe to Next" is displayed on another UI object 912, thereby indicating that if the user performs a swipe in the ">" direction, a function corresponding to the forward button is performed. The plurality of UI objects 910 may be displayed if a predetermined period of time has elapsed after the first visual effect 921 is displayed.

The user input signal corresponding to the user input 91 may be continuously received while the plurality of UI objects 910 are being displayed as shown in screen (c-1). In this case, the user input 91 may be a continuous gesture 91 of dragging in the first direction following the hold gesture 9 in FIG. 9.

If a user input signal corresponding to the drag gesture 91 in the first direction is received, the processor 12 may perform control such that the touch screen 11 displays an execution screen 981 of a function corresponding to the UI object 911 corresponding to the user gesture 91 as shown in screen (c-2). The processor 12 may perform control such that the touch screen 11 displays, as the execution screen 981 of the function corresponding to the UI object 911, a web page previous to the currently displayed web page 901.

The user input signal corresponding to the user input 92 may be continuously received as shown in screen (d-1) while the plurality of UI objects 910 are being displayed in screen (b). In this case, the user input 92 may be a continuous gesture 92 of dragging in the second direction following the hold gesture 9 of screen (b). For example, the gesture 92 of dragging in the second direction may be a gesture of dragging in a direction opposite the first direction in which the drag gesture 91 is made in screen (c-1).

If a user input signal corresponding to the user input of the drag gesture 92 in the second direction is received, the processor 12 may perform control such that the touch screen 11 displays an execution screen 991 of a function corresponding to the UI object 912 corresponding to the user gesture 92 as shown in screen (d-2). The processor 12 may perform control such that the touch screen 11 displays, as the execution screen 991 of the function corresponding to the UI object 912, a web page subsequent to the currently displayed web page 901.

Figure 10:
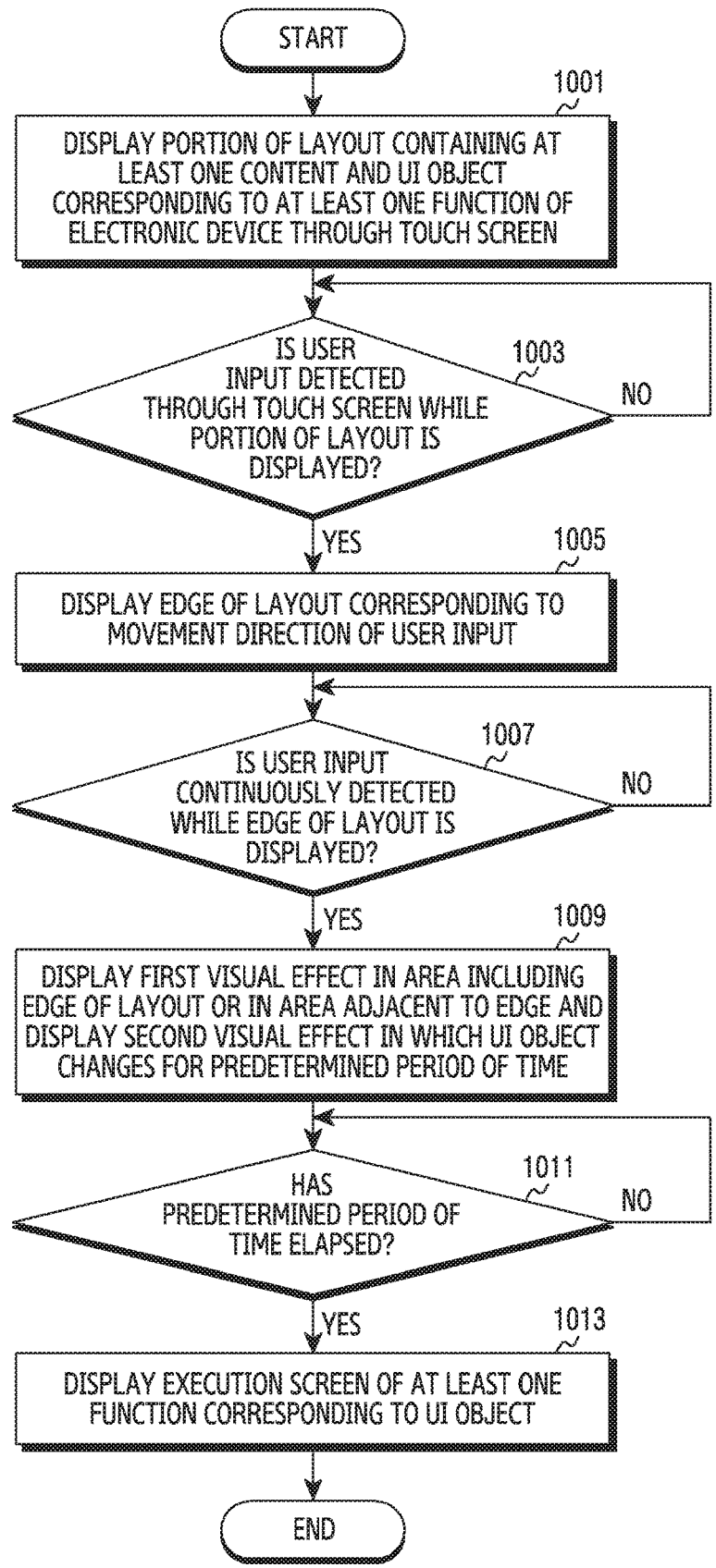
FIG. 10 is a flowchart for executing a function of an electronic device according to an embodiment of the disclosure.

FIG. 10 is a flowchart for executing a function of an electronic device 1 according to an embodiment of the disclosure.

Referring to FIG. 10, the electronic device 1 may display, on the touch screen 11, at least a portion of the layout containing at least one content and a UI object corresponding to at least one function of the electronic device 1 in operation 1001.

In operation 1003, the electronic device 1 may determine whether a user input is detected via the touch screen 11 while the portion of the layout is being displayed.

If it is determined that a user input has been detected in operation 1003, the electronic device 1 may display an edge of the layout corresponding to the movement direction of the user input (or an edge of the layout displayed after the layout is moved in the movement direction of the user input) in operation 1005.

For example, if the user input is an upward drag input, the edge of the layout may be the edge of the layout located at the lower part of the layout or the edge corresponding to the lowermost end of the layout, and if the user input is a downward drag input, the edge of the layout may be the edge of the layout located at the upper part of the layout or the edge corresponding to the uppermost end of the layout.

In operation 1007, the electronic device 1 may determine whether or not the user input is continuously detected while the edge of the layout is being displayed. If the user input detected while the portion of the layout is being displayed is a drag gesture in operation 1003, the user input detected while the edge of the layout is being displayed may be a continuous hold gesture following the drag gesture, or may be a continuous and additional drag gesture following the drag gesture.

If the user input is continuously detected (YES in operation 1007), the electronic device 1 may display a first visual effect in an area including the edge of the layout or in an area adjacent to the edge in operation 1009. In addition, the electronic device 1 may display a second visual effect in which the UI object changes for a predetermined period of time. The second visual effect may include changing the visual form of the UI object as a predetermined period of time elapses. For example, the second visual effect may be an effect in which at least a portion of the UI object gradually (or sequentially) switches from a first color to a second color (or a second color in which at least one of the color, brightness, or chroma has been changed) in proportion to the lapse of a predetermined period of time.

Alternatively, the second visual effect may include changing the scale of the screenshot of the screen including the layout as a predetermined period of time elapses.

The predetermined period of time may be a specific period of time after the display of the first visual effect starts, a specific period of time after the display of the first visual effect ends (or disappears), a specific period of time after the display of the edge of the layout starts, or a specific period of time after the continuous user input is determined to be a hold gesture.

In addition, the operation of displaying the second visual effect may include an operation of displaying the second visual effect while the first visual effect is being displayed, an operation of displaying the second visual effect after the first visual effect is displayed, an operation of displaying the second visual effect before the first visual effect is displayed, or an operation of displaying both at least a portion of the first visual effect and at least a portion of the second visual effect.

In operation 1011, the electronic device 10 may determine whether or not the predetermined period of time has elapsed.

If the predetermined period of time has elapsed (YES in operation 1011), the electronic device 1 may display an execution screen of at least one function corresponding to the UI object in operation 1013. For example, the at least one function may include a function of displaying a screen previous to the current screen being displayed on the touch screen or a function of displaying a screen subsequent to the current screen. In this case, if the predetermined period of time has elapsed and if no user input is detected, the electronic device 1 may display an execution screen of at least one function corresponding to the UI object.

Figure 11:
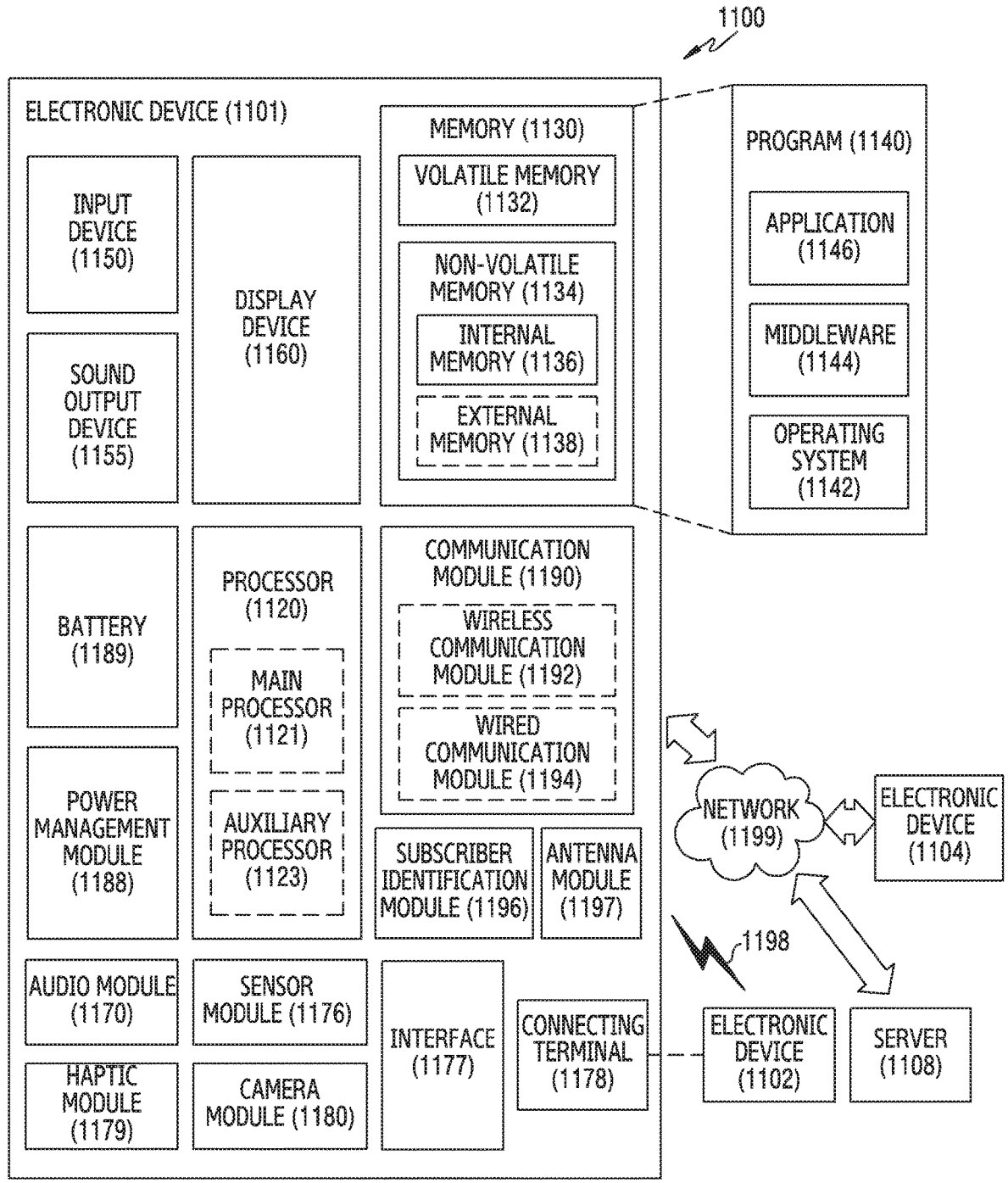
FIG. 11 is a block diagram of an electronic device in a network environment according to an embodiment of the disclosure.

FIG. 11 is a block diagram illustrating an electronic device in a network environment according to an embodiment of the disclosure.

Referring to FIG. 11, the electronic device 1101 in the network environment 1100 may communicate with an electronic device 1102 via a first network 1198 (e.g., a short-range wireless communication network), or an electronic device 1104 or a server 1108 via a second network 1199 (e.g., a long-range wireless communication network). The electronic device 1101 may communicate with the electronic device 1104 via the server 1108. The electronic device 1101 may include a processor 1120, memory 1130, an input device 1150, a sound output device 1155, a display device 1160, an audio module 1170, a sensor module 1176, an interface 1177, a haptic module 1179, a camera module 1180, a power management module 1188, a battery 1189, a communication module 1190, a subscriber identification module (SIM) 1196, or an antenna module 1197. In some embodiments, at least one (e.g., the display device 1160 or the camera module 1180) of the components may be omitted from the electronic device 1101, or one or more other components may be added in the electronic device 1101. In some embodiments, some of the components may be implemented as single integrated circuitry. For example, the sensor module 1176 (e.g., a fingerprint sensor, an iris sensor, or an illuminance sensor) may be implemented as embedded in the display device 1160 (e.g., a display).

The processor 1120 may execute, for example, software (e.g., a program 1140) to control at least one other component (e.g., a hardware or software component) of the electronic device 1101 coupled with the processor 1120, and may perform various data processing or computation. As at least part of the data processing or computation, the processor 1120 may load a command or data received from another component (e.g., the sensor module 1176 or the communication module 1190) in volatile memory 1132, process the command or the data stored in the volatile memory 1132, and store resulting data in non-volatile memory 1134. The processor 1120 may include a main processor 1121 (e.g., a central processing unit (CPU) or an application processor (AP)), and an auxiliary processor 1123 (e.g., a graphics processing unit (GPU), an image signal processor (ISP), a sensor hub processor, or a communication processor (CP)) that is operable independently from, or in conjunction with, the main processor 1121. Additionally or alternatively, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display device 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). The auxiliary processor 1123 (e.g., an ISP or a CP) may be implemented as part of another component (e.g., the camera module 1180 or the communication module 1190) functionally related to the auxiliary processor 1123.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134. The non-volatile memory may include internal memory 1136 and external memory 1138.

The program 1140 may be stored in the memory 1130 as software, and may include, for example, an OS 1142, middleware 1144, or an application 1146.

The input device 1150 may receive a command or data to be used by other component (e.g., the processor 1120) of the electronic device 1101, from the outside (e.g., a user) of the electronic device 1101. The input device 1150 may include, for example, a microphone, a mouse, or a keyboard.

The sound output device 1155 may output sound signals to the outside of the electronic device 1101. The sound output device 1155 may include, for example, a speaker or a receiver. The speaker may be used for general purposes, such as playing multimedia or playing record, and the receiver may be used for an incoming calls. The receiver may be implemented as separate from, or as part of the speaker.

The display device 1160 may visually provide information to the outside (e.g., a user) of the electronic device 1101. The display device 1160 may include, for example, a display, a hologram device, or a projector and control circuitry to control a corresponding one of the display, hologram device, and projector. The display device 1160 may include touch circuitry adapted to detect a touch, or sensor circuitry (e.g., a pressure sensor) adapted to measure the intensity of force incurred by the touch.

The audio module 1170 may convert a sound into an electrical signal and vice versa. According to an embodiment, the audio module 1170 may obtain the sound via the input device 1150, or output the sound via the sound output device 1155 or a headphone of an external electronic device (e.g., an electronic device 1102) directly (e.g., via a wire or cable) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. The sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., via a wire or cable) or wirelessly. The interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). The connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. The haptic module 1179 may include, for example, a motor, a piezoelectric element, or an electric stimulator.

The camera module 1180 may capture a still image or moving images. The camera module 1180 may include one or more lenses, image sensors, ISPs, or flashes.

The power management module 1188 may manage power supplied to the electronic device 1101. The power management module 1188 may be implemented as at least part of, for example, a power management integrated circuit (PMIC).

The battery 1189 may supply power to at least one component of the electronic device 1101. The battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more CP that are operable independently from the processor 1120 (e.g., the AP) and supports a direct (e.g., wired) communication or a wireless communication. The communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, Wi-Fi direct, or IR data association (IrDA)) or the second network 1199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 198 or the second network 1199, using subscriber information (e.g., international mobile subscriber identity (IMSI)) stored in the SIM 1196.

The antenna module 1197 may transmit or receive a signal or power to or from the outside (e.g., the external electronic device) of the electronic device 1101. The antenna module 1197 may include one or more antennas, and, therefrom, at least one antenna appropriate for a communication scheme used in the communication network, such as the first network 1198 or the second network 1199, may be selected, for example, by the communication module 1190 (e.g., the wireless communication module 1192). The signal or the power may then be transmitted or received between the communication module 1190 and the external electronic device via the selected at least one antenna.

Some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 1101 and the external electronic device 1104 via the server 1108 coupled with the second network 1199. Each of the electronic devices 1102 and 1104 may be a device of a same type as, or a different type, from the electronic device 1101. All or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, or client-server computing technology may be used, for example.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. The electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to", "connected with", or "connected to" another element (e.g., a second element), it means that the element may be coupled with the other element directly (e.g., via a wire or cable), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute the one or more instructions, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semipermanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of executing a function of an electronic device, the method comprising:
    displaying a first portion of a layout which is scrollable and contains at least one content, and a user interface (UI) object corresponding to at least one function of the electronic device through a touch screen of the electronic device;
    detecting a user input for scrolling the layout through the touch screen while the first portion of the layout is being displayed;
    displaying a second portion of the layout in response to the user input, and the UI object;
    in response to the user input being continuously detected after the second portion of the layout is displayed, displaying the UI object with a visual effect in which the UI object changes for a predetermined period of time; and
    when the predetermined period of time has elapsed, displaying an execution screen of the at least one function corresponding to the UI object.

2. The method of claim 1, wherein the predetermined period of time comprises one of a specific period of time after the displaying of the second portion of the layout starts or a specific period of time after the continuously detected user input is determined to be a hold gesture.

3. The method of claim 1,
    wherein the user input detected while the first portion of the layout is displayed comprises a drag gesture, and
    wherein the user input detected while the second portion of the layout is displayed comprises one of a continuous hold gesture following the drag gesture or a continuous and additional drag gesture following the drag gesture.

4. The method of claim 1, wherein the displaying of the execution screen of the at least one function if the predetermined period of time has elapsed comprises displaying the execution screen of the at least one function when the predetermined period of time has elapsed and no user input is detected.

5. The method of claim 1, wherein the at least one function comprises a function of displaying a screen previous to a current screen being displayed through the touch screen or a function of displaying a screen subsequent to the current screen.

6. The method of claim 1, wherein the visual effect comprises an effect in which a visual form of the UI object changes as the predetermined period of time elapses.

7. The method of claim 6, wherein the change in the visual form of the UI object comprises a case where at least a portion of the UI object gradually switches from a first color to a second color in proportion to a lapse of the predetermined period of time.

8. The method of claim 1, wherein the visual effect comprises an effect in which a scale of a screenshot of a screen comprising the layout changes as the predetermined period of time elapses.

9. The method of claim 1,
    wherein the second portion of the layout is an edge of the layout located at the lower part of the layout if the user input is an upward drag input, and
    wherein the second portion of the layout is an edge of the layout located at the upper part of the layout if the user input is a downward drag input.

10. An electronic device comprising:
    a touch screen;
    at least one processor; and
    at least one memory electrically connected to the touch screen and the at least one processor,
    wherein the at least one memory stores one or more instructions that allow the at least one processor to:
        when a user input signal corresponding to a user input for scrolling a layout is received through the touch screen of the electronic device while a first portion of the layout which is scrollable and contains at least one content and a user interface (UI) object corresponding to at least one function of the electronic device are being displayed, perform control such that the touch screen displays a second portion of the layout and the UI object;
        in response to the user input signal being continuously received after the second portion of the layout is displayed, perform control such that the touch screen displays the UI object with a visual effect in which the UI object changes for a predetermined period of time, and
        when the predetermined period of time has elapsed, perform control such that the touch screen displays an execution screen of the at least one function corresponding to the UI object.

11. The electronic device of claim 10, wherein the predetermined period of time comprises one of a specific period of time after starting to display the second portion of the layout or a specific period of time after the continuously detected user input is determined to be a hold gesture.

12. The electronic device of claim 10,
wherein the user input signal received while the first portion of the layout is being displayed comprises a signal corresponding to a drag gesture, and
wherein the user input signal received while the second portion of the layout is being displayed comprises one of a signal corresponding to a continuous hold gesture following the drag gesture or a signal corresponding to a continuous and additional drag gesture following the drag gesture.

13. The electronic device of claim 10, wherein the at least one memory stores one or more instructions that allow the at least one processor to control the touch screen so as to display an execution screen of the at least one function if the predetermined period of time has elapsed and if no user input is detected.

14. The electronic device of claim 10, wherein the at least one function comprises one of a function of displaying a screen previous to a current screen being displayed through the touch screen or a function of displaying a screen subsequent to the current screen.

15. The electronic device of claim 10, wherein the visual effect comprises an effect in which a visual form of the UI object changes as the predetermined period of time elapses.

16. The electronic device of claim 15, wherein the change in the visual form of the UI object comprises a case where at least a portion of the UI object gradually switches from a first color to a second color in proportion to a lapse of the predetermined period of time.

17. The electronic device of claim 10, wherein the visual effect comprises an effect in which a scale of a screenshot of a screen comprising the layout changes as the predetermined period of time elapses.

18. A computer program product comprising a computer-readable recording medium comprising instructions that allow a computer to:
when a user input signal corresponding to a user input for scrolling a layout is received through a touch screen of an electronic device while a first portion of the layout which is scrollable contains at least one content and a user interface (UI) object corresponding to at least one function of an electronic device are being displayed, perform control such that the touch screen displays a second portion of the layout and the UI object,
in response to the user input signal being continuously received while the second portion of the layout is displayed, perform control such that the touch screen displays the UI object with a visual effect in which the UI object changes for a predetermined period of time, and
when the predetermined period of time has elapsed, perform control such that the touch screen displays an execution screen of the at least one function corresponding to the UI object.

* * * * *